Jan. 12, 1943.  B. A. ROSE ET AL  2,308,028
SALIENT-POLE TIGHTENING MEANS
Filed Jan. 28, 1942
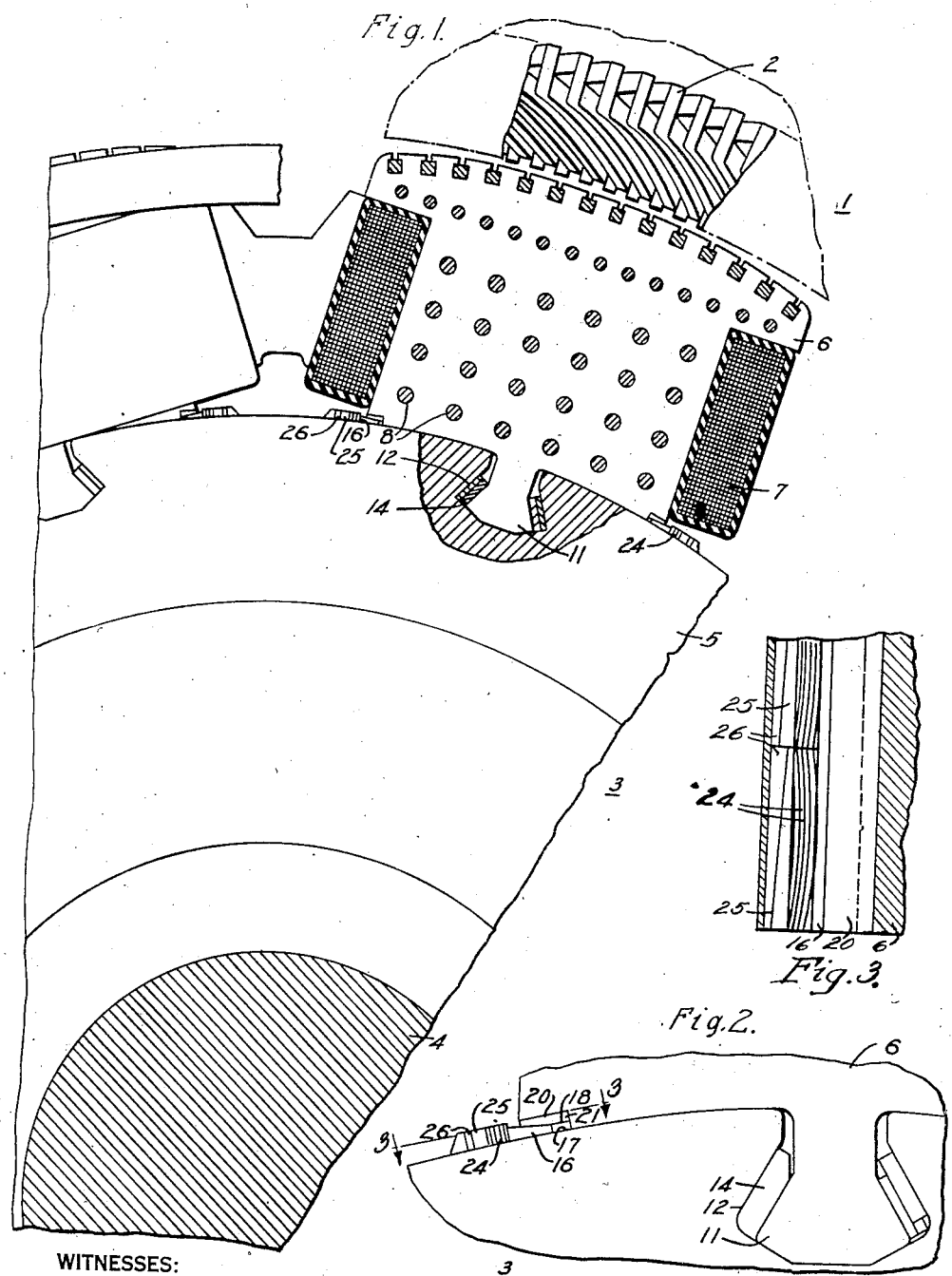
INVENTORS
Bennie A. Rose and
Rene A. Baudry.
BY
ATTORNEY Patented Jan. 12, 1943

2,308,028

UNITED STATES PATENT OFFICE 2,308,028

SALIENT-POLE TIGHTENING MEANS

Bennie A. Rose and René A. Baudry, Wilkinsburg, Pa., assignors to Westinghouse Electric & Manufacturing Company, East Pittsburgh, Pa., a corporation of Pennsylvania Application January 28, 1942, Serial No. 428,528

6 Claims. (Cl. 171—252)

Our present invention, in its specific application, is primarily directed to a large salient-pole dynamo-electric machine, such as a 300-R. P. M., 25-cycle, single-phase generator, and it has particular relation to self-tightening spring-pressed wedging-means which we have provided for automatically taking up any loose play between the salient-pole pieces and the rotor-spider, so that the pole-pieces are held in substantially their outermost positions which they ever attain during times of maximum outwardly pulling forces on said pole-pieces. In its more general aspects, our invention relates to such spring-pressed, self-tightening wedging-means for the projecting of pole-pieces of any rotating spider, in connection with any rotating apparatus whatsoever. Our invention relates to high-speed machines, in the sense of any machines in which the rotor-member in question has high peripheral speeds, sufficient to develop centrifugal forces of a magnitude high enough to stretch the salient or projecting pieces out away from the outer periphery of the rotor-spider to which they are attached.

In large salient-pole single-phase generators, for example, a 30,000-kva., 25-cycle, 10-pole generator, the poles are very large, being 85" long and having a weight of about 15,000 pounds apiece, in the example named. These pole-pieces, having an outer peripheral diameter of 139", in the example named, present a considerable problem in regard to properly keying the pole-pieces to the rotor-spider. In addition to carrying the direct-current exciting-coils, these pole-pieces carry amortisseur windings and are of laminated construction, so that the most practical way of holding each individual pole-piece down against the spider-periphery is to provide either one or two dovetails for each pole-piece, said dovetails fitting into dovetail-slots in the outer periphery of the rotor-spider, and the dovetail-punchings being usually tightened by means of tapered or wedge-shaped dovetail keys driven between the dovetails and the slots.

It has been found, by experience, that the tapered wedges or keys in the dovetail slots cannot be driven sufficiently tightly to keep the pole-pieces tight against the spider at the normal operating speed, because the centrifugal force acting on the pole-piece is much larger than the force which can be produced by the tapered dovetail keys. When the rotor is operated at a 15% overspeed, the pole dovetail assemblies, in a specific example, stretched approximately $\frac{1}{32}$". Experience has demonstrated that the salient pole-pieces of such machines are actually loose, during normal operating conditions, so that the poles were lifted from the spider a distance of from .020 to .030", due to centrifugal force at normal speeds, and the lower corners of each pole-piece were rocking relative to the spider with a 5-cycle motion of from .002 to .003" amplitude as a result of gravity, and also with a superimposed 50-cycle motion having an amplitude of from .003 to .005" due to the pulsating single-phase torque. It will be readily appreciated that such rocking motion of the poles, if permitted to persist, would result in broken dovetailed-punchings, broken amortisseur or damper bars, and the like.

The principal object of our invention is to correct the above-named difficulties by providing self-tightening spring-pressed wedges which are movable in a tangential plane between the leading and trailing backs of the pole-pieces and the rotor-spider.

With the foregoing and other objects in view, our invention consists in the machines, structures, parts, combinations and methods hereinafter described and claimed, and illustrated in the accompanying drawing, wherein:

Figure 1 is a fragmentary end-view of a dynamo-electric machine embodying our invention, with one of the pole-pieces shown in section, Fig. 2 is a detailed end-view illustrating the application of our spring-pressed wedges to one of the rear corners of one of the pole-pieces, and Fig. 3 is a fragmentary plan-view of the spring-assembly, as viewed along the line III—III in Fig. 2.

We have illustrated our invention in connection with the single-phase generator previously mentioned, the same comprising a stator member 1 which has the single-phase or alternating-current winding 2, and a rotor member 3 comprising a shaft 4, a spider-member 5 carried by the shaft, and ten laminated salient-pole pieces 6 carried by the spider-member. Each of the salient pole-pieces 6 carries a direct-current exciting-coil 7 and a damper-winding or amortisseur winding 8. Each salient pole-piece has a laminated magnetizable core-member, one of the laminations or punchings being shown in side-elevation in the pole-piece which is shown in section in Fig. 1; and each lamination is dovetailed into the spider-member by being provided with a dovetail 11 which fits within a dovetail-slot 12 cut into the outer periphery of the spider-member 5. The dovetails are somewhat smaller than the slots, and the intervening spaces are taken up with tapered dove-tail-keys or wedges 14.

In accordance with our invention, the back portions of the salient-pole cores, which should abut tightly against the outer periphery of the spider-member 5, are provided, at both their leading and trailing edges, with self-tightening wedges 16. The self-tightening wedges 16 are interposed between an outer peripheral surface 17 of the spider, and an inner peripheral surface 18 of the salient pole-piece. In actual construction, a rectangular notch 20 was cut out of the back portion of each pole-piece, at both the leading and trailing edges thereof, and a wedge 21 was utilized to provide the inner peripheral surface 18 of the pole-piece, which was engaged by the outer surface of the wedge 16. It will be noted that the surfaces 17 and 18 are inclined at a small wedging-angle with respect to each other, to accommodate the wedging-angle of the self-tightening wedge 16. It will be further noted that this self-tightening wedge 16 is movable approximately in a tangential plane, or along the outer peripheral surface 17 of the spider 5, so that the salient pole-piece can be held out, away from the spider 5, practically as far as it ever moves under the maximum pulling-out forces to which it is ever subjected.

Our self-tightening wedges 16 are resiliently pressed into their wedging engagement with the respective pairs of abutment-surfaces 17 and 18 by a suitable spring-means, which is illustrated, in Figs. 2 and 3, in the form of a set of initially bowed steel springs 24 which are compressed against the wedge 16 by means of tapered keys 25 and 26.

In operation, when the dovetails 11 stretch, under the influence of centrifugal forces, during the rotation of the rotor-member, the springs 24 move the several wedges 16 in, so as to take up any loose play that would otherwise be provided between the salient pole-pieces 6 and the spider 5, and experience has shown that this is an effective means for reducing the rocking of the pole-pieces to an altogether negligible amount. In actual practice, we prefer to operate the rotor-member momentarily at a 15% overspeed, so that the pole-piece dovetails are stretched more than they will be, in normal operation, thus making the pole-pieces more rigid and immovable with respect to the spider-member, under all normal operating-conditions. The friction of the wedges 16, and the smallness of their wedging-angle, combine with the spring-pressure to prevent backward movement of the wedges after the removal of the forces which initially permitted the wedges to move inwardly, and thus the wedges hold the pole-pieces in substantially their outermost positions which they ever attain under the operational stresses developed in the machine.

While we have illustrated our dovetail-connections as being provided with tapered keys 14, in a manner which has been common, heretofore, prior to the introduction of our self-tightening wedges 16, it will be noted that our self-tightening wedges 16 render the use of the dovetail-wedges or keys 14 really unnecessary, thus making it possible to use somewhat larger dovetails 11 on the pole-pieces 6, while retaining the same size of dovetail-slots 12 in the outer periphery of the spider-member 5, thus obtaining a larger factor of safety in the highly stressed dovetails 11, which constitute one of the most critically stressed parts of the machine.

We claim as our invention:

1. A salient-pole dynamo-electric machine having substantially non-rockingly supported salient pole-pieces, comprising the combination; with the rotor-spider of the machine, and the salient pole-pieces, and dovetails carried by the pole-pieces and fitting in dovetail-slots in the periphery of the rotor-spider; of spring-pressed means automatically movable during the rotation of the machine in response to relative radial movement of the pole-pieces with respect to the spider for holding said pole-pieces in substantially their outermost positions which they ever attain under the operational stresses developed in the machine.

2. A dynamo-electric machine having a stator-member with an alternating-current winding, and a rotor-member with a direct-current winding, said rotor-member having a spider-member and a plurality of laminated salient-pole pieces dovetailed onto the outer periphery of the spider-member, and automatically responsive means, operable during the rotation of the machine, and responsive to a separation of a pole-piece from the spider, for keeping said pole-piece substantially at its maximum separation from the spider permitted by its dovetail connection thereto.

3. Tightening-means for a high-speed apparatus of a type having a rotating spider and a plurality of projecting pieces secured to the outer periphery of the spider, said tightening-means comprising a set of self-tightening, resiliently pressed holding-means, operable during the rotation of the machine, and responsive to looseness that may develop between the spider and the projecting pieces during times of maximum outwardly pulling forces on said projecting pieces, for holding the several pieces substantially in said outwardly pulled positions.

4. A salient-pole dynamo-electric machine having substantially non-rockingly supported salient pole-pieces, comprising the combination; with the rotor-spider of the machine, and the salient pole-pieces, and dovetails carried by the pole-pieces and fitting in dovetail-slots in the periphery of the rotor-spider; of wedges movable in approximately a tangential plane for pushing the several pole-pieces radially outwardly against the retaining action of the dovetails, and spring-means for automatically moving the wedges inwardly to take up loose-play between the pole-pieces and the spider during operation; the friction of said wedges and the smallness of the wedging angle combining with the spring-pressure to prevent backward movement of the wedges after the removal of the forces which initially permitted the wedges to move inwardly, whereby the pole-pieces are held in substantially their outermost positions which they ever attain under the operational stresses developed in the machine.

5. A dynamo-electric machine having a stator-member with an alternating-current winding, and a rotor-member with a direct-current winding, said rotor-member having a spider-member and a plurality of laminated salient-pole pieces dovetailed onto the outer periphery of the spider-member, and resiliently pressed, self-tightening wedging-means interposed between the pole-pieces and the rotor-spider for keeping the pole-pieces substantially at the maximum separation from the spider permitted by said dovetail connections.

6. Tightening-means for a high-speed apparatus of a type having a rotating spider and a plurality of projecting pieces secured to the outer periphery of the spider, said tightening-means comprising a set of self-tightening, resiliently pressed wedging-means adapted to be interposed, in effect, between an outer peripheral surface of the spider and inner peripheral surfaces of the respective projecting pieces, one of said surfaces of each associated pair of surfaces being inclined at a wedging-angle with respect to the other surface, in each instance, whereby the wedging-means will automatically take up looseness that may develop between the spider and said projecting pieces during times of maximum outwardly pulling forces on said projecting pieces.

BENNIE A. ROSE.
RENÉ A. BAUDRY.